Jan. 30, 1923.
H. V. DUNHAM.
PROCESS OF TREATING WHEY.
FILED MAR. 6, 1920.
1,443,528
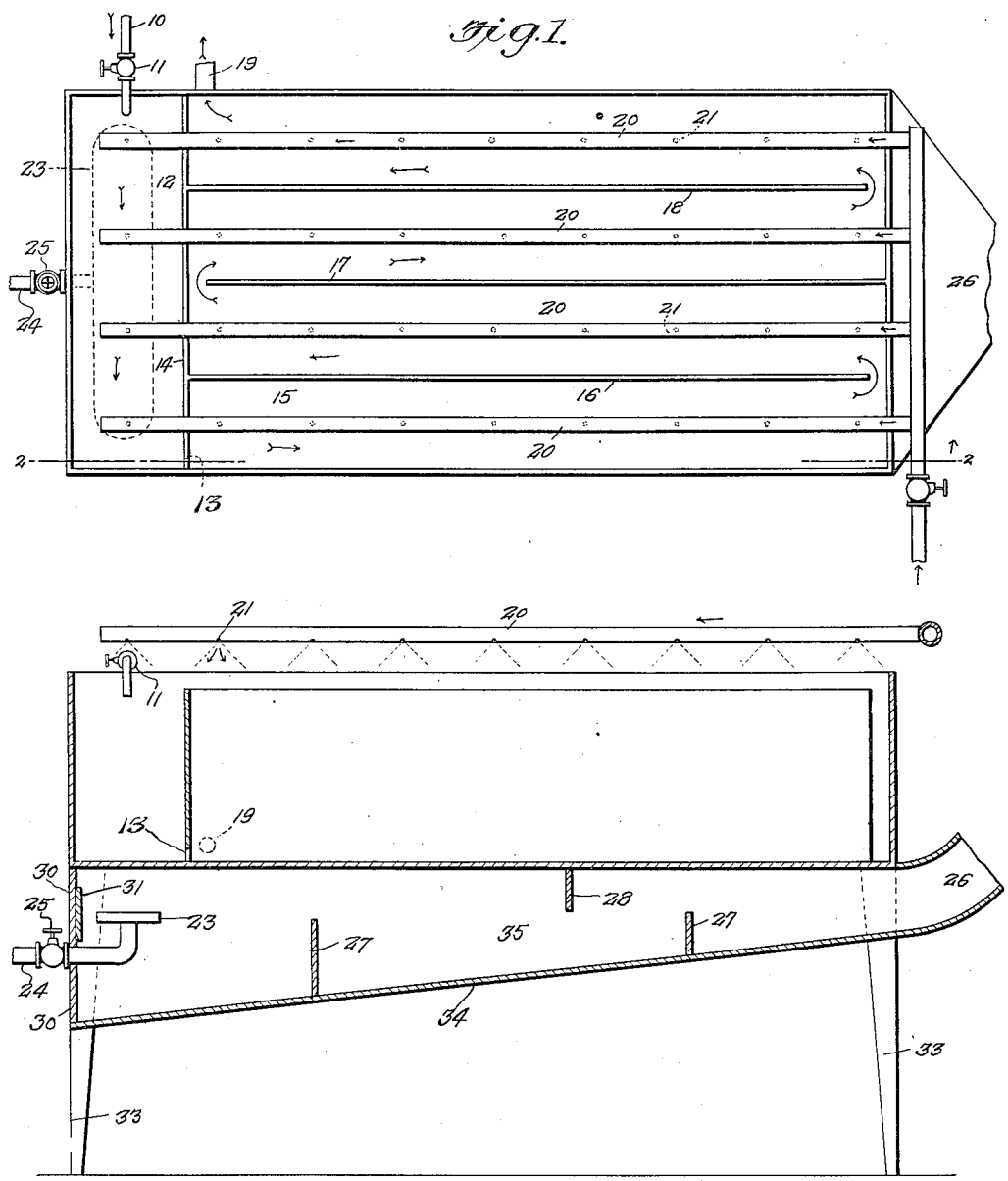

Patented Jan. 30, 1923.

1,443,528

UNITED STATES PATENT OFFICE.

HENRY V. DUNHAM, OF MOUNT VERNON, NEW YORK.

PROCESS OF TREATING WHEY.

Application filed March 6, 1920. Serial No. 363,751.

*To all whom it may concern:*

Be it known that I, HENRY V. DUNHAM, a citizen of the United States of America, residing at Mount Vernon, in the county of Westchester and State of New York, have invented certain new and useful Improvements in Processes of Treating Whey, of which the following is a specification.

The present invention has for its object an improvement in the treatment of whey, whereby the whey can be evaporated or concentrated to any desired extent, in a uniform and safe manner, while preventing excessive foaming of the liquid during evaporation, as well as preventing the tendency of the partially condensed whey from becoming overheated and thus burning or caramelizing the sugar content in the whey.

Heretofore whey has been evaporated on a commercial scale for the production of milk sugar, and so far as I have been advised, all successful commercial evaporation of whey has been conducted in vacuum pans, and the attempts which have been made to employ open pans have been unsuccessful, due to the fact that the whey foams very badly during concentration, if evaporated over an open fire, as for example in an open pan. Ordinarily in the evaporation of whey in open pans, aside from the excessive foaming of the substance, there is a great tendency, especially where thin layers of whey are in the process of evaporation, for the whey to foam to the extent that it is literally one mass of bubbles, with the result that there is not enough liquid resting on the bottom of the pan to keep the material from burning. Under such conditions, although there may be a volume of whey, representing for example an inch of the liquid in the pan, yet in this excessive foamy condition, no real uniform body of liquid will be resting on the pan, but simply a foamy mass, with the result that caramelization takes place. The process of evaporation or concentration of whey would be entirely satisfactory if conducted in an open pan, particularly in an open pan divided into compartments by upstanding baffle plates, if it were not for the excessive foaming, which is produced by such treatment, and which, according to the ordinary processes, cannot be controlled. Wherever attempts have been made to evaporate whey in such pans, so far as I have been advised, they have been unsuccessful, because the whey foams excessively and the foam runs over from one compartment of the pan into the next, so that the liquids in the several compartments of the pan become mixed and there is no uniformity of flow of the whey from what should be one compartment into what should be the next compartment. Furthermore, the tendency to caramelize, especially when the water is partially condensed, also renders it almost impossible to use an ordinary open pan and secure any rapidity in evaporation, because the moment the heat is high enough to produce rapid and violent evaporation, especially where the whey has been partially condensed, a tendency occurs for the sugar in the whey to burn, and this necessitates slowing down the fire under the pan to a very large extent and thus prolongs the time of evaporation to such an extent that the expense of evaporation is prohibitive.

I have now found that by directing a blast of air against the upper surface of the foaming liquid, I am able to readily break up the foam bubbles, in such a manner as to readily control the flow of the liquid through the pan, so that the foam will not rise sufficiently at any time to pass from one compartment of the pan over the baffle into another compartment, nor will the foam rise sufficiently to flow over the sides of the pan. I am also able by this method to hold sufficient liquid in the bottom of the pan to keep the sugar content in the whey from caramelizing or burning.

The blast of air can be produced by any convenient device, an ordinary electric fan or similar device being in many cases sufficent and in other cases, a series of pipes can be placed above the pan, these pipes being perforated with numerous small holes at frequent intervals for blowing jets of air in a downward direction, (or horizontally or slant-wise) against the surface of the liquid.

It is, of course, understood that the foaming of the liquid in itself, does no harm if the foam bubbles are broken up either as soon as they reach the surface of the liquid or as soon enough thereafter to prevent the foam from passing from one compartment to the next, or for preventing the foam from passing over the top of the sides of the pan, or if the foaming is not so excessive as to tend to cause all of the material in the pan to assume a foamy condition, and thus cause caramelization of the sugar content.

The process of the present case may conveniently be carried out in an apparatus such as is diagrammatically shown by way of example in the annexed drawings, in which Fig. 1 shows a plan view of the entire apparatus and Fig. 2 shows a vertical section of the same on the line 2—2 of Fig. 1.

In the operation of the process with this apparatus, the whey is fed in through the pipe 10 provided with a valve 11, into the first compartment 12, the liquid flowing through said compartment and through the opening 13 in the bottom of the baffle plate 14 into the next compartment 15, flowing around the end of the baffle plate 16, then around the end of the baffle plate 17, then around the end of the baffle plate 18, then finally out through the outlet pipe 19. Located over the evaporating pan are suitable means for directing a blast or preferably a large number of blasts of air or other gas downwardly onto the surface of the liquid. For this purpose the pipes 20 provided with numerous perforations 21, on the lower sides thereof, are illustrated. The evaporating pan is heated by direct fire and products of combustion. In the drawing a burner 23 is shown for burning oil, this burner being provided with a suitable feed pipe 24 and a controlling valve 25.. The flames and products of combustion pass toward the outlet end of the flue 26. This flue, if desired, may be provided with upstanding baffle plates 27 and a downwardly extending baffle plate 28, in order to more completely utilize the heat of the gases. It is understood that the front of the fire box, 30, will be provided with suitable air admission ports, which are capable of regulation, in order to admit the proper amount of air for the combustion of the oil. The air admission may be regulated by a suitable sliding plate 31 having holes which can be brought into registry with corresponding holes in plate 30.

The entire evaporating pan may, if desired, rest on suitable legs 33, or on any other suitable foundation. A sheet metal or asbestos plate 34 may be provided below the bottom of the fire box in order to leave a space 35 open at its ends, for preventing injury of the floor on which the pan is placed.

It is understood that the above described apparatus is given purely by way of example and as illustrating a suitable apparatus for carrying out the process. The pan may be heated by the combustion of any suitable fuel in place of oil, and in place of the perforated pipes 20, any other device for introducing a blast or blasts of air can be used.

It will be understood that during the concentration of the whey, more or less of the constituents thereof may become precipitated, this being particularly true of the lactalbumin, lime salts and the like, and it is accordingly advisable from time to time to run some kind of a scraper over the bottom of the pan, in all of the compartments. A hand-scraper may be employed for this purpose if desired. The flow of whey through the pipe 10 into the apparatus should be preferably so adjusted that the liquid flowing out through 19 will be saturated as to milk sugar, or if so desired, this liquid flowing out may carry some precipitated lactose in suspension. The liquid can be drawn off and worked up for the recovery of its content of lactose or milk sugar in any suitable manner.

By the means described, I am enabled to concentrate whey to any desired state of concentration, in a uniform and readily controllable manner, so that the concentrated whey will reach the outlet end of the evaporating pan in a uniformly concentrated state.

I am, of course, aware that in the evaporation of liquids, it has heretofore been proposed to blow currents of hot air or hot products of combustion over the surface of the liquid being evaporated for the purpose of aiding evaporation. However, I am not aware that this operation has ever been conducted in connection with liquids which have an excessive foaming tendency, or which have such a tendency to foam that there is danger of the burning or caramelizing of the material I am also aware that in the evaporation of liquids having a tendency to foam, it has heretofore been proposed to add a small amount of mineral oil or paraffin wax in order to prevent the formation of foam. However, such methods will not be found efficient when applied to such liquids as whey to prevent the foaming thereof during evaporation.

While I have referred in the specification to air as being a suitable gaseous fluid, I call attention to the fact that any desired gaseous fluid can be employed equally as well as air.

By the employment of this invention, I am enabled to secure a result which has not heretofore been produced on a commercial scale, so far as I am advised, namely, the concentration of whey in an open pan without excessive foaming, without burning or caramelizing, and with the production of a uniformly concentrated whey, the process being entirely continuous.

I claim:—

The process of evaporating or concentrating whey, which liquid is known to have a marked tendency to excessive foaming when boiled by direct fire heat, which process comprises directly applying fire heat to the bottom of a pan having upstanding baffle plates, and containing the said liquid, while under substantially atmospheric pressure, maintaining a relatively shallow layer of flowing liquid whey in said evaporating pan, past said upstanding baffle plates thereby causing the whey under evaporation to travel as a liquid in a tortuous path over the whole bottom of such pan, while simultaneously directing a blast of gaseous fluid against the foaming surface of the boiling whey whereby the foam bubbles are broken, and excessive foaming of the liquid, and also the burning of the foam on the bottom of the pan, and the overflow of foam over the baffles, are avoided, and drawing off the concentrated whey from said pan in liquid state.

In testimony whereof I affix my signature.
HENRY V. DUNHAM.